April 25, 1944.  H. W. THORNBURG  2,347,224
COUNTERWEIGHTED SPUDDING GEAR
Filed May 5, 1941  2 Sheets-Sheet 1

Herbert W. Thornburg
INVENTOR.
BY Hoar & Ruhloff
ATTORNEY.

April 25, 1944. H. W. THORNBURG 2,347,224
COUNTERWEIGHTED SPUDDING GEAR
Filed May 5, 1941 2 Sheets-Sheet 2

Herbert W. Thornburg.
INVENTOR.
BY Hoar & Ruhloff
ATTORNEY.

Patented Apr. 25, 1944

2,347,224

UNITED STATES PATENT OFFICE 2,347,224

COUNTERWEIGHTED SPUDDING GEAR

Herbert W. Thornburg, South Milwaukee, Wis., assignor to Bucyrus-Erie Company, South Milwaukee, Wis., a corporation of Delaware Application May 5, 1941, Serial No. 391,861

6 Claims. (Cl. 255—11)

My invention relates to new and useful improvements in portable drills, in particular to safety devices in spudding drills.

A dangerous condition in spudding drills is that a pitman or connecting rod between the spudding beam and the spudding gear may stop in either one or two precarious positions, endangering the operator.

The first hazardous condition is when the pitman comes to rest at the bottom dead center position of the spudding gear. When the drilling line is unloaded, this position is one of stable equilibrium into which the pitman naturally falls in normal operation of the drill. But if the drilling tools are loaded on the line while the pitman is in this position, equilibrium then becomes unstable so that a slight vibration will cause the pitman and spudding gear to move off dead center and the tools to drop suddenly the full length of the stroke, with possible injury to the operator.

The second hazardous position is when the pitman comes to rest at the top dead center position of the spudding gear. When the drilling line is loaded, this is a position of stable equilibrium to which the pitman naturally rises, but if the tools are unloaded from the line while the pitman is in this position, equilibrium then becomes unstable so that a slight vibration will cause the pitman to move off the top dead center, allowing the spudding beam to drop the full length of its travel, endangering anyone working on the machinery.

Heretofore two types of safety devices have been employed. One is a latch pivoted on the frame to hold the spudding beam either up in top dead center position when the line is slackened, or down in bottom dead center position when the line is loaded.

This device is unsatisfactory because it is not automatic—an essential feature of any safety device. The other method has been to employ a brake and clutch mechanism which operates to lock the spudding gear when the operating clutch is released. This device is, however, very expensive, requiring a number of costly parts.

Accordingly it is a principal object of my invention to remove these hazards by providing means whereby a position of stable equilibrium cannot be converted into a hazardous position of unstable equilibrium by a mere change of the load on the line.

Another object of my invention is to provide a safety device such that a position of unstable equilibrium of the pitman and spudding gear cannot be attained in the course of normal operation of the drill.

Another object of my invention is to provide a safety device which is automatic in operation, requires no adjustments, is cheap to build, and will not wear out.

In addition to my principal objects, above stated, I have worked out a number of novel and useful details which will be readily evident as the description progresses.

My invention consists in the novel parts and in the combination and arrangement thereof, which are defined in the appended claims, and of which one embodiment is exemplified in the accompanying drawings, which are hereinafter particularly described and explained.

Throughout the description, the same reference number is applied to the same members or to similar members.

Figure 4:
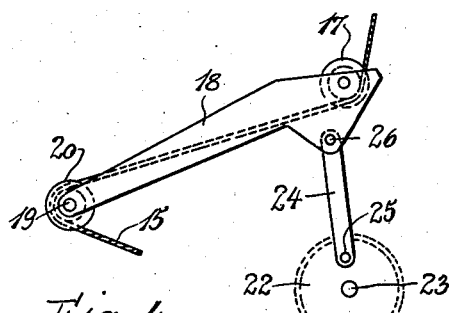
Figure 5:
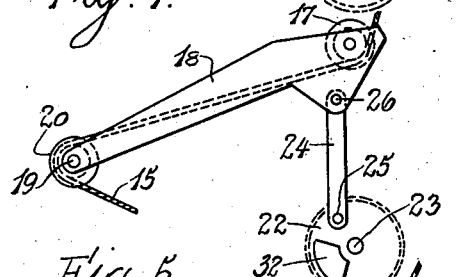
Figure 6:
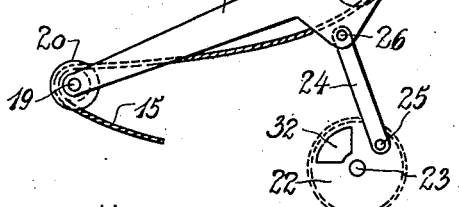

Figures 4, 5 and 6 are similar views showing the pitman in top positions of equilibrium. In Figure 4 there is no counterweight or spring, and the position shown is the dead-center position of equilibrium, stable or unstable, depending on whether the line is loaded or unloaded. In Figures 5 and 6 the spudding gear carries a counterweight and is shown in positions of stable (line loaded) and unstable (line slack) equilibrium respectively, both positions being off dead-center.

Figure 7:
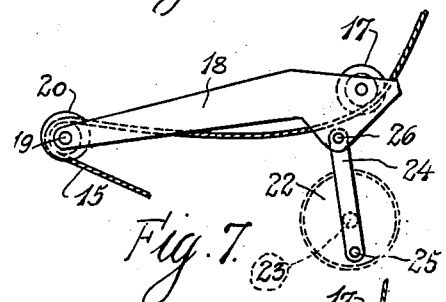
Figure 8:
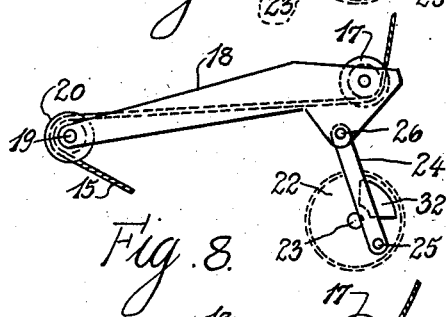
Figure 9:
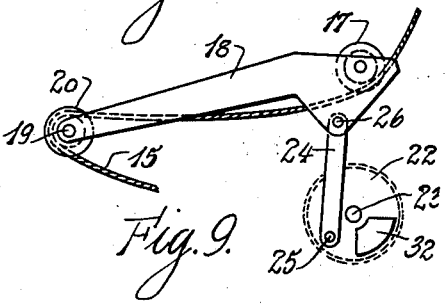

Figures 7, 8 and 9 correspond to Figures 4, 5 and 6 respectively, but with the pitman shown in bottom positions of equilibrium.

Figure 1:
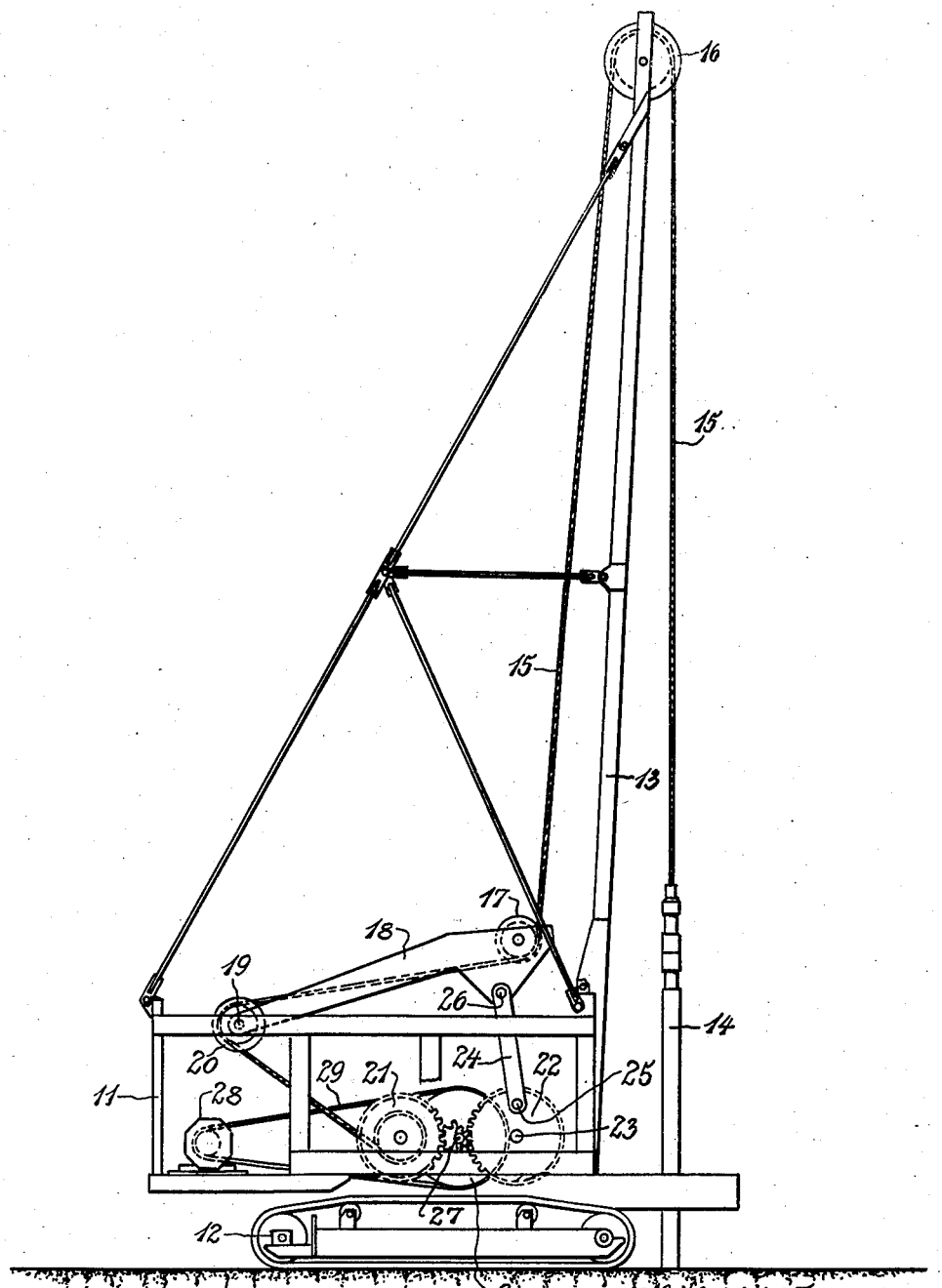
Figure 1 is a diagrammatic side elevation of a portable spudding drill showing the relation of the various operating parts, the spudding mechanism being near top dead center position with the line loaded and without any safety device.

Referring now to Figure 1 we see that the spudding drill to which I have applied my invention, and which I have conventionally illustrated in this figure, includes a main frame 11, movably carried by any suitable means such as a Caterpillar truck 12. The frame 11 carries at one end, which is designated as the forward end, a derrick 13, suitably supported and braced. The drilling tool 14 is supported by a steel cable 15, extending upwardly over sheave 16 rotatably mounted on the top of the derrick 13. The cable then passes downwardly around the sheave 17 located at the free forward end of the spudding beam 18, which is pivoted at its rear end to the main frame 11 on the shaft 19 of the heel sheave 20. The cable then passes around the heel sheave 20 and thence to the bull reel 21 mounted on the main frame 11 upon which a portion of the cable is wound. By rotary movement of the bull reel 21 the tool 14 may be lifted in operative position or lowered toward the work and gradually advanced as the work progresses.

The spudding beam 18 is rocked up and down by the rotation of the spudding gear 22, acting through the pitman 24, which is pivotally connected to the spudding gear and to the forward end of the spudding beam at 25 and 26 respectively. The spudding gear rotates on shaft 23 journalled on the main frame.

Turning movement is controlled and imparted to the spudding gear 22 and bull reel 21 from the jack shaft 27 by suitable gear and clutch connections (not shown). The jack shaft is operated by an engine, indicated generally at 28, which drives the belt 29 and pulley 30 on the jack shaft 27.

It will be seen that spudding gear 22 serves as a crank to drive pitman 24, and accordingly the word "crank" will be used generically in the claims to include any equivalent means for this purpose, regardless whether it takes the form of a gear or other wheel, or of a crank in the popular sense.

Referring now to Figures 4 and 7, we see that these show the spudding mechanism in the top and bottom dead center positions of stable equilibrium into which the spudding mechanism naturally falls when there is no safety device and the line is respectively loaded and unloaded in normal operation of the drill. In both of these positions, the center 23 of the spudding gear 22 is in the line defined by the pivot points 25 and 26 of the pitman, so that a change in the load on the drilling line may make the equilibrium unstable without changing the position of equilibrium.

It is understood that when, in this application, I use the term "dead center" position I mean a position in which the center of the spudding gear (or axial point of any equivalent crank means), the point of connection between the pitman (or equivalent link means) and the spudding beam, and the point of connection between the pitman (or link means) and the spudding gear (or crank means) lie in a single straight line.

Figure 2:
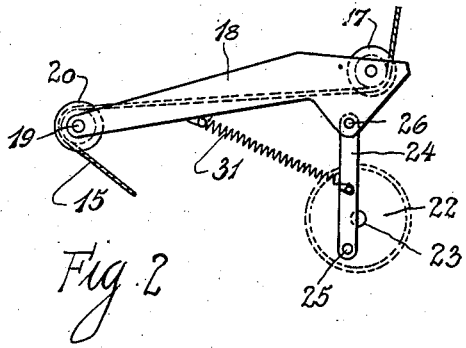
Figure 2 is a fragmentary schematic side elevation view of a spudding beam, spudding gear and pitman being pulled out of dead-center position by a spring safety device.

My invention employs a means which separates the positions of stable and unstable equilibrium and locates these positions so that a change of load on the line will always upset equilibrium, obviating conditions of extreme unstability. My means may consist of a counterweight, a spring or other equivalent means whereby a turning moment is set up whenever the spudding gear is in either the top or bottom dead center positions of Figures 4 and 7. For example, in Figure 2 I show a spring 31 which is connected between the pitman and the spudding beam and serves to pull the pitman and spudding gear off the top and bottom dead center positions. Although I have shown this spring anchored to the spudding beam, it may be anchored to any other convenient part of the machine, and likewise the particular place of attachment of the other active end of the spring is immaterial so long as the spring fulfills its functions as defined by my objects. It is understood that my invention is not limited to such details.

Figure 3:
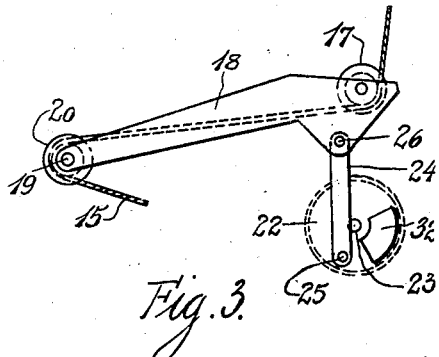
Figure 3 is a similar view showing a safety device consisting of a counterweight on the spudding gear.

In Figure 3 I show a counterweight 32 located on the face of the spudding gear to one side of the pivot point of the pitman. This is a simple and preferred form of my invention, but it is understood that this form is not necessary and that any other means with an equivalent function in the light of my objects will suffice and is a part of my invention.

Figures 5 and 6 show the new top positions of stable and unstable equilibrium respectively when the counterweight is used.

Figures 8 and 9 show the corresponding bottom positions. It is seen that in all cases a change in load on the line will move the pitman and destroy the balanced condition.

Having now described and illustrated one form of my invention, I wish it to be understood that my invention is not limited to the specific form or arrangement of parts herein described and shown, except as specifically covered by my claims.

I claim:

1. In a cable-tool drilling machine, the combination of: a base; a mast projecting upwardly above the base; a sheave, journaled on the mast; a spudding beam, pivoted on the base, for oscillation in a vertical plane; a crank on the base; means to rotate the crank; control means for said last-named means; link means, operatively connecting the beam and the crank, whereby rotation of the crank will impart oscillation to the beam; a tool-carrying cable, passing over the sheave, to the beam, for oscillation thereby; and counterweight means on the crank, and so located that no position of equilibrium of the system will coincide with a position of dead center of the crank and link.

2. In a cable-tool drilling machine, the combination of: a base; a mast projecting upwardly above the base; a sheave, journaled on the mast; a spudding beam, pivoted on the base, for oscillation in a vertical plane; a crank on the base; means to rotate the crank; control means for said last-named means; link means, operatively connecting the beam and the crank, whereby rotation of the crank will impart oscillation to the beam; a tool-carrying cable, passing over the sheave, to the beam, for oscillation thereby; and counterweight means on the crank, and so located that no position of equilibrium, with the cable under tension due to the weight of the tool, of the system will coincide with a position of dead center of the crank and link.

3. In a cable-tool drilling machine, the combination of: a base; a mast projecting upwardly above the base; a sheave, journaled on the mast; a spudding beam, pivoted on the base, for oscillation in a vertical plane; a crank on the base; means to rotate the crank; control means for said last-named means, link means, operatively connecting the beam and the crank, whereby rotation of the crank will impart oscillation to the beam; a tool-carrying cable, passing over the sheave, to the beam, for oscillation thereby; and counterweight means on the crank, and so located that no position of equilibrium, with the tool detached, of the system will coincide with a position of dead center of the crank and link.

4. In a cable-tool drilling machine, the combination of: a base; a mast projecting upwardly above the base; a sheave, journaled on the mast; a spudding beam, pivoted on the base, for oscillation in a vertical plane; a crank on the base; means to rotate the crank; control means for said last-named means; link means, operatively connecting the beam and the crank, whereby rotation of the crank will impart oscillation to the beam; a tool-carrying cable, passing over the sheave, to the beam, for oscillation thereby; and counterweight means operatively connected to the crank, and so located that no position of equilibrium of the system will coincide with a position of dead center of the crank and link.

5. In a cable-tool drilling machine, the combination of: a base; a mast projecting upwardly above the base; a sheave, journaled on the mast; a spudding beam pivoted on the base, for oscillation in a vertical plane; a crank on the base; means to rotate the crank; control means for said last-named means; link means, operatively connecting the beam and the crank, whereby rotation of the crank will impart oscillation to the beam; a tool-carrying cable, passing over the sheave, to the beam, for oscillation thereby; and means operatively connected to the crank in such manner as to bias the crank so that no position of equilibrium of the system will coincide with a position of dead center of the crank and link.

6. In a cable-tool drilling machine, the combination of: a base; a mast projecting upwardly above the base; a sheave, journaled on the mast; a spudding beam pivoted on the base, for oscillation in a vertical plane; a crank on the base; means to rotate the crank; control means for said last-named means; link means, operatively connecting the beam and the crank, whereby rotation of the crank will impart oscillation to the beam; a tool-carrying cable, passing over the sheave, to the beam, for oscillation thereby; and spring means operatively connected to the crank in such manner as to bias the crank so that no position of equilibrium of the system will coincide with a position of dead center of the crank and link.

HERBERT W. THORNBURG.